United States Patent
Ji et al.

(10) Patent No.: US 9,717,096 B2
(45) Date of Patent: Jul. 25, 2017

(54) METHOD AND APPARATUS FOR A MOBILE SELECTION BASED INITIAL ACCESS SCHEME IN A MULTICARRIER SYSTEM

(75) Inventors: Hyoung Ju Ji, Seoul (KR); Joon Young Cho, Suwon-si (KR); Myung Hoon Yeon, Yongin-si (KR); Young Bum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 638 days.

(21) Appl. No.: 12/817,825

(22) Filed: Jun. 17, 2010

(65) Prior Publication Data

US 2010/0322174 A1 Dec. 23, 2010

(30) Foreign Application Priority Data

Jun. 17, 2009 (KR) .......... 10-2009-0053709

(51) Int. Cl.
*H04W 74/00* (2009.01)
*H04W 74/08* (2009.01)

(52) U.S. Cl.
CPC ..... *H04W 74/006* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2008/0253323 A1 | 10/2008 | Fischer | |
| 2010/0222060 A1* | 9/2010 | Zhang | H04W 36/30 455/436 |
| 2010/0227569 A1* | 9/2010 | Bala et al. | 455/73 |
| 2010/0285809 A1* | 11/2010 | Lindstrom | H04L 5/001 455/450 |
| 2010/0296467 A1* | 11/2010 | Pelletier | H04W 74/002 370/329 |
| 2011/0075629 A1* | 3/2011 | Seo | H04W 74/002 370/330 |
| 2011/0216731 A1* | 9/2011 | Frederiksen | H04W 48/12 370/329 |
| 2012/0063409 A1* | 3/2012 | Novak | H04L 5/0055 370/330 |

FOREIGN PATENT DOCUMENTS

WO  WO 2008/097023  8/2008

OTHER PUBLICATIONS

NTT DOCOMO, "Initial Access Procedure for Asymmetric Wider Bandwidth in LTE-Advanced", R1-090312, 3GPP TSG RAN WG1 Meeting #55bis, Jan. 12-16, 2009.
Korean Office Action dated May 18, 2015 issued in counterpart application No. 10-2009-0053709.

* cited by examiner

*Primary Examiner* — Chirag Shah
*Assistant Examiner* — Srinivasa Reddivalam
(74) *Attorney, Agent, or Firm* — The Farrell Law Firm, P.C.

(57) ABSTRACT

A method and apparatus for initial access of a mobile device in multi-carrier system. A base station transmits initial access resource information about the entire system band to the mobile device through a specific carrier to which the mobile device tries initial access. The mobile device determines an uplink initial access band by using received initial access resource information. The base station enables initial access through a predefined downlink response band.

12 Claims, 13 Drawing Sheets

FIG. 4
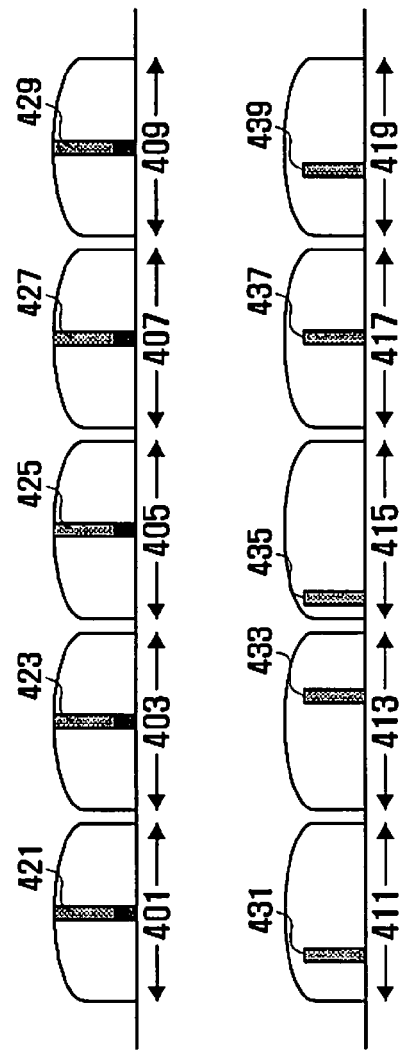
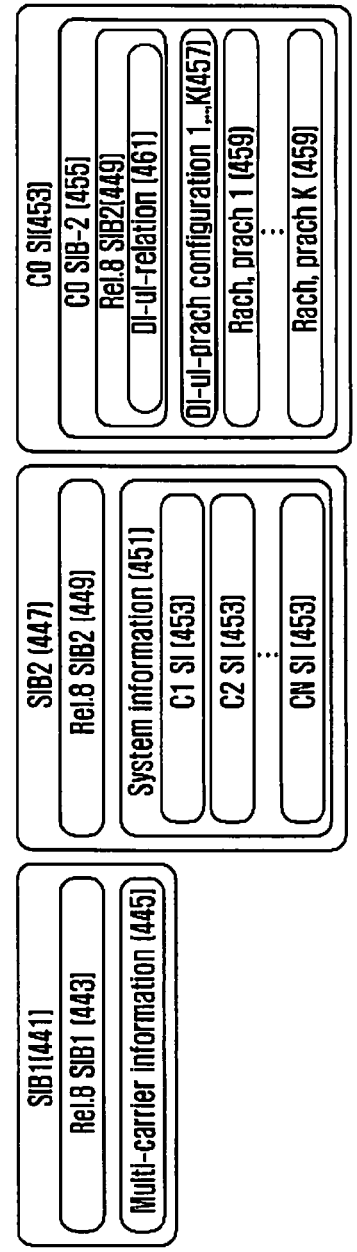

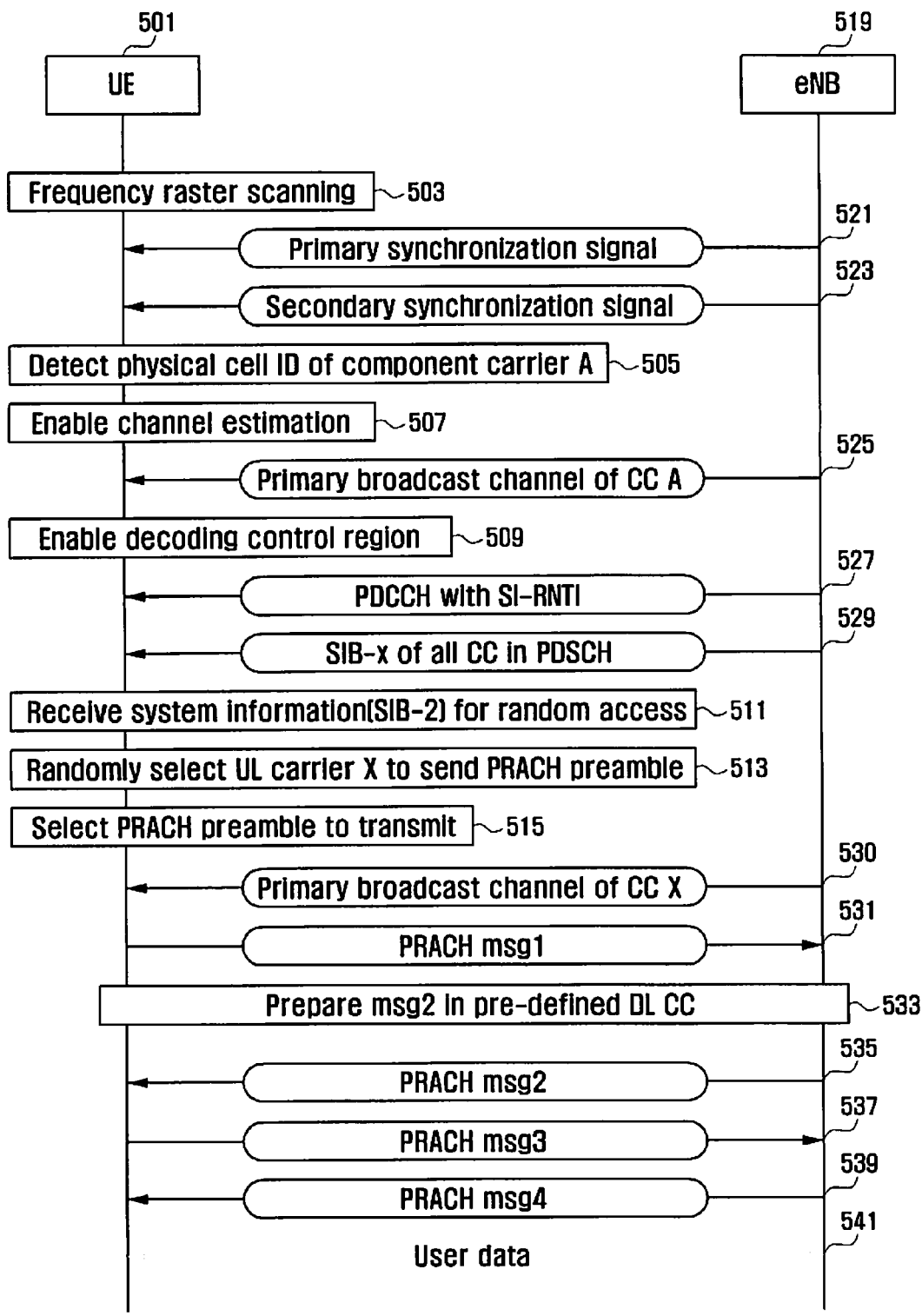

FIG. 6B
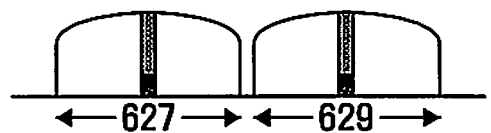
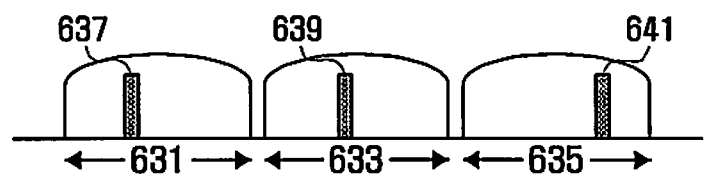

FIG. 9
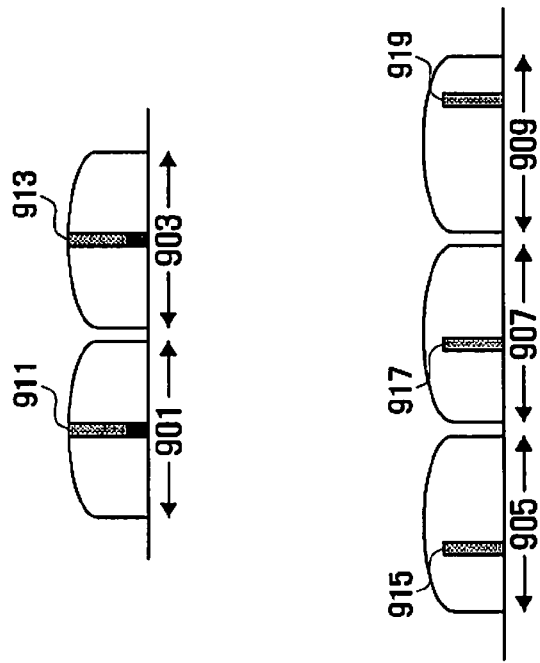
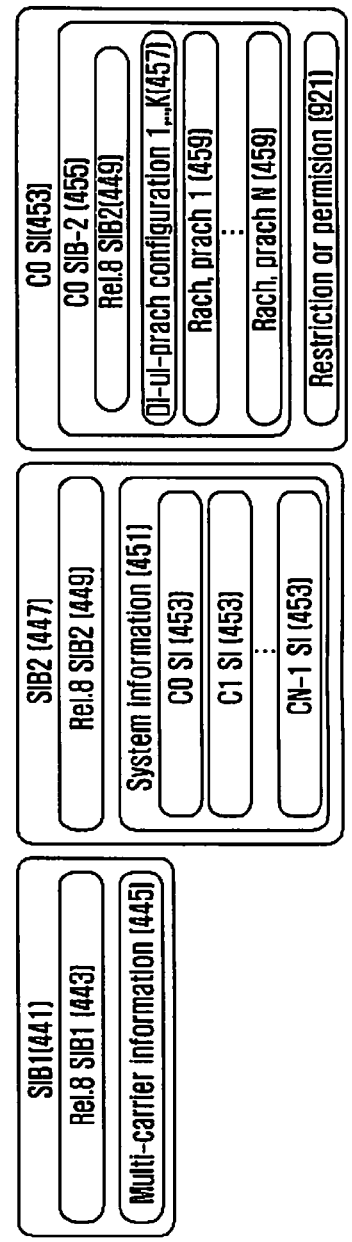

METHOD AND APPARATUS FOR A MOBILE SELECTION BASED INITIAL ACCESS SCHEME IN A MULTICARRIER SYSTEM

PRIORITY

This application claims priority under 35 U.S.C. §119(a) to an application filed in the Korean Intellectual Property Office on Jun. 17, 2009 and assigned Serial No. 10-2009-0053709, the content of which is hereby incorporated by reference.

BACKGROUND OF THE INVENTION

1. Field of the Invention

The present invention relates generally to a wireless communication system and, more particularly, to a method and apparatus for determining a transmission band for initial access in an Orthogonal Frequency Division Multiplexing (OFDM) wireless communication system using a multi-carrier.

2. Description of the Related Art

Normally, an OFDM transmission scheme enables data transmission using a multi-carrier. This scheme is one of the available multi carrier modulation schemes that parallelize a row of symbols that are input in series, and then modulates the parallel rows of symbols to a number of multi-carriers, i.e., sub-carrier channels. The OFDM scheme is similar to a traditional Frequency Division Multiplexing (FDM) scheme, but is inherently characterized by its orthogonality. Namely, OFDM scheme maintains orthogonality among a plurality of tones and therefore realizes optimal transmission efficiency in high rate data transmission.

Additionally, OFDM scheme provides efficient frequency usage and is resistant to multi-path fading, providing optimal transmission efficiency in high rate data transmission.

In wireless communication, data rate and quality of service are dependent upon channel environment. Normally, channel environment in wireless communication may vary frequently due to Additive White Gaussian Noise (AWGN), variations in received signal power caused by fading, shadowing, Doppler effect caused by movement, and changes in velocity of a mobile device, interference caused by other users, multi-path signals, etc. Consequently, it is important to overcome such obstructions in the channel environment in order to support a high data rate and high quality data service.

In an OFDM scheme, a modulated signal is located on two-dimensional resources including time and frequency. Resources on the time axis are distinguished by different OFDM symbols, which are orthogonal to each other. Resources on the frequency axis are distinguished by different tones, which are orthogonal to each other. Specifically, in an OFDM scheme, one unit resource is defined by both a specific OFDM symbol appointed on the time axis and a specific tone appointed on the frequency axis. This is often referred to as a Resource Element (RE).

Different resource elements still have orthogonal properties even though they pass through a frequency selective channel. Accordingly, signals can be transmitted to a receiver through different resource elements without causing interference.

A physical channel is a channel on a physical layer for transmitting symbols that are modulated from a row of one or more coded bits. In the OFDMA system, a plurality of physical channels are configured and transmitted according to the uses of transmission data rows or according to receivers. A transmitter and a receiver agree in advance to a rule of correspondence established between a physical channel and a resource element. This rule is often referred to as a mapping rule.

A Long Term Evolution (LTE) system is a representative system in which OFDMA system is applied to a downlink while Single Carrier Frequency Division Multiple Access (SC-FDMA) is applied to an uplink. The LTE system includes a downlink band and a corresponding uplink band.

FIG. 1 illustrates a downlink band and an uplink band in a conventional LTE system.

Referring to FIG. 1, reference number 101 indicates a conceptive structure of an LTE downlink. Reference numbers 111 and 109 indicate transmission of synchronization signals, and reference number 105 indicates transmission of broadcast channel information.

The LTE system defines bands used for a downlink as indicated by reference numbers 131, 135, 137, and 139, and defines bands used for an uplink as indicated by reference numbers 133, 141, 143, and 145. Therefore, LTE system includes a combination of a downlink and an uplink, such as reference numbers 139 and 141.

An LTE Advanced (LTE-A) system is an expanded system of LTE and also realizes a higher transmission rate by continuously using a plurality of bands. The LTE-A system uses a plurality of bands as a downlink and an uplink, respectively. Each individual band may exist in the same band to form continuous frequency bands or may exist in different bands to form discontinuous frequency bands as indicated by reference numbers 121, 123, and 125.

After being powered on, a mobile device determines whether there is an accessible system. For example, a mobile device performs frequency raster scanning to find a specific system connectible with a given frequency. The frequency raster scanning determines whether a synchronization signal exists in a specific frequency by every 100 KHz. Because a synchronization signal has a bandwidth of 1.04 MHz, an LTE system scans 1.04 MHz bandwidth by every central frequency of 100 KHz as indicated by a reference number 103.

When receiving a synchronization signal of 111 and 109 during the scanning, the mobile device obtains system information about the band and then performs initial access. Although a synchronization signal is transmitted, a mobile device sometimes fails to receive the signal and then tries another reception at the next raster.

FIG. 2 illustrates a physical channel structure of a downlink band 211 and an uplink band 212 in a conventional LTE system.

Referring to FIG. 2, a single band includes ten subframes 200 to 209, and a downlink band uses a front part 219 of a subframe for control channel transmission and the other part for data channel transmission. There are two kinds of synchronization signals, namely, a Primary Synchronization Signal (PSS), which is also referred to as the first synchronization signal, and a Secondary Synchronization Signal (SSS), which is also referred to as the second synchronization signal. A PSS is transmitted through subframes 0 and 5, as indicated by a reference number 215, and an SSS is sent in front of the PSS, as indicated by a reference number 213.

Broadcast channel information may be transmitted in two ways; through a broadcast channel, and through a data channel.

In the LTE system, a broadcast channel is referred to as a primary broadcast channel or Physical Broadcast CHannel (PBCH) and transmitted at the rear of the PSS through a subframe 0, as indicated by a reference number 217. A mobile device transmits a minimum amount of information for access to a downlink band through the PBCH. This information is referred to as a Master Information Block (MIB).

Table 1 below shows information transmitted through an MIB.

In Table 1, di-Bandwidth refers to bandwidth information about a downlink, phich-Cong refers to configuration information about a Physical Hybrid Automatic Repeat Request (HARQ) Indicator CHannel (PHICH), and systemFrameNumber refers to a frame number of a received signal.

TABLE 1

Information Field in Master Information Block

MasterInformationBlock = SEQUENCE
{
dl-Bandwidth,
phich-Cong,
systemFrameNumber,
spare
}

System information transmitted through a data channel, rather than a broadcast channel, is referred to as a System Information Block (SIB). Normally, there are several SIBs. System Information (SI) required for a system is sorted by its need and transmitted through a plurality of SIBs.

For receiving an SIB, a mobile device receives a control channel region of a subframe by using an MIB. Also, the mobile device finds a transmission location of system information in a data channel by using scheduling information from among system information in a control channel region.

For initial access, the mobile device should receive at least SIB-1 (i.e., the first system information block) and SIB-2 (i.e., the second system information block).

Tables 2 and 5 below show information about SIB-1 and SIB-2, respectively. The remaining information is transmitted through a system information configuration as shown in Table 3, and system information is formed as system information-r8-Ies, as shown in Table 4, which indicates which SIB is transmitted.

TABLE 2

Information Field in System Information Block Type 1

SystemInformationBlockType1 = SEQUENCE
{
cellAccessRelatedInfo,
cellSelectionInfo,
freqBandIndicator,
schedulingInfoList,
{si-Periodicity, sib-MappingInfo},
si-WindowLength,
systemInfoValueTag
}

TABLE 3

Information Field in System Information

SystemInformation = CHOICE
{
SystemInformation-r8-IEs,
criticalExtensionsFuture
}

TABLE 4

Information Field in System Information-r8-Ies

SystemInformation-r8-Ies = SEQUENCE
{
sib-TypeAndInfo,
sibx
}

TABLE 5

Information Field in System Information Block Type 2

SystemInformationBlockType2 = SEQUENCE
{
ac-BarringInfo,
radioResourceConfigCommon,
ue-TimersAndConstants,
ul-CarrierFreq,
ul-Bandwidth
mbsfn-SubframeConfigList
}

Information received through SIB-1 shows time and period of SIB-2 transmission. SIB-2 transmits information about an uplink band and information about a Physical Random Access CHannel (PRACH) for initial access. PRACH information is included in radio resource config common information of SIB-2, which is shown in Table 6.

TABLE 6

Information Field in Radio Resource Config Common SIB

RadioResourceConfigCommonSIB = SEQUENCE
{
rach-Config,
bcch-Config,
pcch-Config,
prach-Config,
pdsch-Config,
pusch-Config,
pucch-Config,
soundingRS-UL-Config,
uplinkPowerControl,
ul-CyclicPrefixLength,
}

PRACH transmission for initial access includes information about rach-Config and prach-Config, which are shown in Tables 7 and 8, respectively.

TABLE 7

Information Field in RACH-Config Common

RACH-ConfigCommon = SEQUENCE
{
numberOfRA-Preambles,
preamblesGroupAConfig,
messagePowerOffsetGroupB,
powerRampingParameters,
ra-SupervisionInfo,
maxHARQ-Msg3Tx
}

TABLE 8

Information Field in PRACH-Config SIB

PRACH-ConfigSIB = SEQUENCE
{

TABLE 8-continued

Information Field in PRACH-Config SIB

```
rootSequenceIndex,
prach-ConfigIndex,
highSpeedFlag,
zeroCorrelationZoneConfig,
prach-FreqOffset
}
```

Particularly, rach-config information in Table 7 includes the number of transmittable signals and other information, and prach-config information in Table 8 indicates parameters for initial access signal generation and a transmission band on the frequency axis. Using Tables 7 and 8, a mobile device obtains PRACH resources for initial access at one uplink band. This defines a transmission region 221 at a specific subframe in an uplink band 213.

FIG. 3 is a flow diagram illustrating a conventional procedure for connecting a mobile device to a cell, after initial access.

Referring to FIG. 3, in step 303, a mobile device 301 (also referred to as User Equipment (UE)) performs a frequency raster scanning for a search of a synchronization signal transmitted from a base station 315 (also referred to as an enhanced Node B (eNB)), after being powered on. In steps 317 and 319, the mobile device 301 receives a PSS and a SSS from the base station 315. In step 305, the mobile device 301 detects a physical cell IDentifier (ID) of a downlink band.

In step 307, the mobile device 301 enables channel estimation to receive a channel transmitted from the base station 315. In step 321, the mobile device receives a PBCH in order to detect an MIB, and in step 309, enables a reception of a PDCCH. Receivable information among PDCCH is a common channel transmitted to all mobile devices, and is encoded through System Information Radio Network Temporary Identifier (SI-RNTI) and transmitted in step 323. Each mobile device receives PDCCH carrying system information by using SI-RNTI stored in advance, and receives SIBs transmitted through a data channel by using received information in step 325.

In step 311, the mobile device 301 detects transmission information about remaining SIBs, after receiving SIB-1, and obtains bandwidth information for uplink transmission and initial access resource information for initial access. In step 313, the mobile device configures a signal to be transmitted by using received PRACH resource information.

In step 327, the mobile device 301 transmits a PRACH message 1 (msg1) through a selected PRACH resource. When receiving PRACH message 1, in step 329, the base station 315 transmits PRACH message 2 (msg2) in response to PRACH message 1. PRACH message 2 includes a temporary identifier offered to the mobile device.

In step 331, the mobile device transmits information used for cell connection through PRACH message 3 (msg3), and if cell connection is possible, in step 333, a cell transmits confirmed information about connection through PRACH message 4 (msg4). In step 335, data transmission is allowed between the mobile device and the base station through downlink and uplink.

As described above, an LTE-A system includes a plurality of downlink bands and a plurality of uplink bands. Accordingly, there are several bands capable of detecting an initial synchronization signal in a single system, and also there are several uplink bands capable of transmitting an initial access signal. In view of LTE, such bands are operated with different cells. Therefore, different bands or carriers will be hereinafter used in the same sense as different cells.

When the mobile device performs a frequency raster scanning, most of the mobile devices detect a synchronization signal at a lowest frequency band among downlink bands, and the rest of the mobile devices detect a synchronization signal at a relatively higher band. In this situation, because most of the mobile devices make cell connections through a single uplink/downlink band, resources are unfavorably concentrated in some bands. Also, such a concentrated band deteriorates the performance of the entire system by lowering a probability of initial access, thereby increasing the number of and time required for initial access of the mobile device.

SUMMARY OF THE INVENTION

The present invention is designed to address at least the above-mentioned problems and/or disadvantages and to provide at least the advantages described below.

An aspect of the present invention is to enable equalized initial access in a multi-band system by reducing imbalanced uses of bands invoked during initial access.

In accordance with an aspect of the present invention, an initial access method of a mobile device in a multi-carrier system is provided. The method includes receiving, from a base station through a specific carrier trying initial access, initial access resource information about at least one carrier among carriers in an entire system band; selecting an initial access resource by using the received initial access resource information; and transmitting an initial access signal to the base station using the selected initial access resource.

In accordance with another aspect of the present invention, an initial access method of a base station in a multi-carrier system is provided. The method includes transmitting, to a mobile device through a specific carrier to which the mobile device tries initial access, initial access resource information about at least one carrier among carriers in an entire system band; receiving an initial access signal through an initial access resource selected by the mobile device; and transmitting an initial access response signal, to the mobile device, in response to the initial access signal.

In accordance with another aspect of the present invention, a mobile device is provided for performing initial access to a base station in a multi-carrier system. The mobile device includes a transceiver that transmits and receives a signal for the initial access; and a controller that controls receiving, from the base station through a specific carrier trying the initial access, initial access resource information about at least one carrier among carriers in an entire system band, selects an initial access resource by using the received initial access resource information, and controls transmitting an initial access signal to the base station by using the selected initial access resource.

In accordance with another aspect of the present invention, a base station that enables initial access of a mobile device in a multi-carrier system is provided. The base station includes a synchronized band initial access resource information generator that generates first initial access resource information about a specific carrier to which the mobile device tries the initial access; a multi-band initial access resource information generator that generates second initial access resource information about remaining carriers other than the specific carrier; a controller that controls generating initial access resource information about the entire system band by using the first and second initial access resource information generated by the generators; a transmitter that transmits the initial access resource information through the specific carrier; and a receiver that receives an initial access signal through an arbitrary initial access resource selected by the mobile device.

BRIEF DESCRIPTION OF THE DRAWINGS

The above and other aspects, features, and advantages of the present invention will be more apparent from the following detailed description in conjunction with the accompanying drawings, in which:

FIG. 4 illustrates a configuration of system information in accordance with an embodiment of the present invention;

FIG. 5 is a flow diagram illustrating a process of initial access in a multi-carrier configuration in accordance with an embodiment of the present invention;

FIGS. 6A and 6B illustrate imbalanced downlink/uplink bands in accordance with an embodiment of the present invention;

FIG. 9 illustrates a configuration of system information in accordance with an embodiment of the present invention;

DETAILED DESCRIPTION OF EMBODIMENTS OF THE INVENTION

Figure 1:
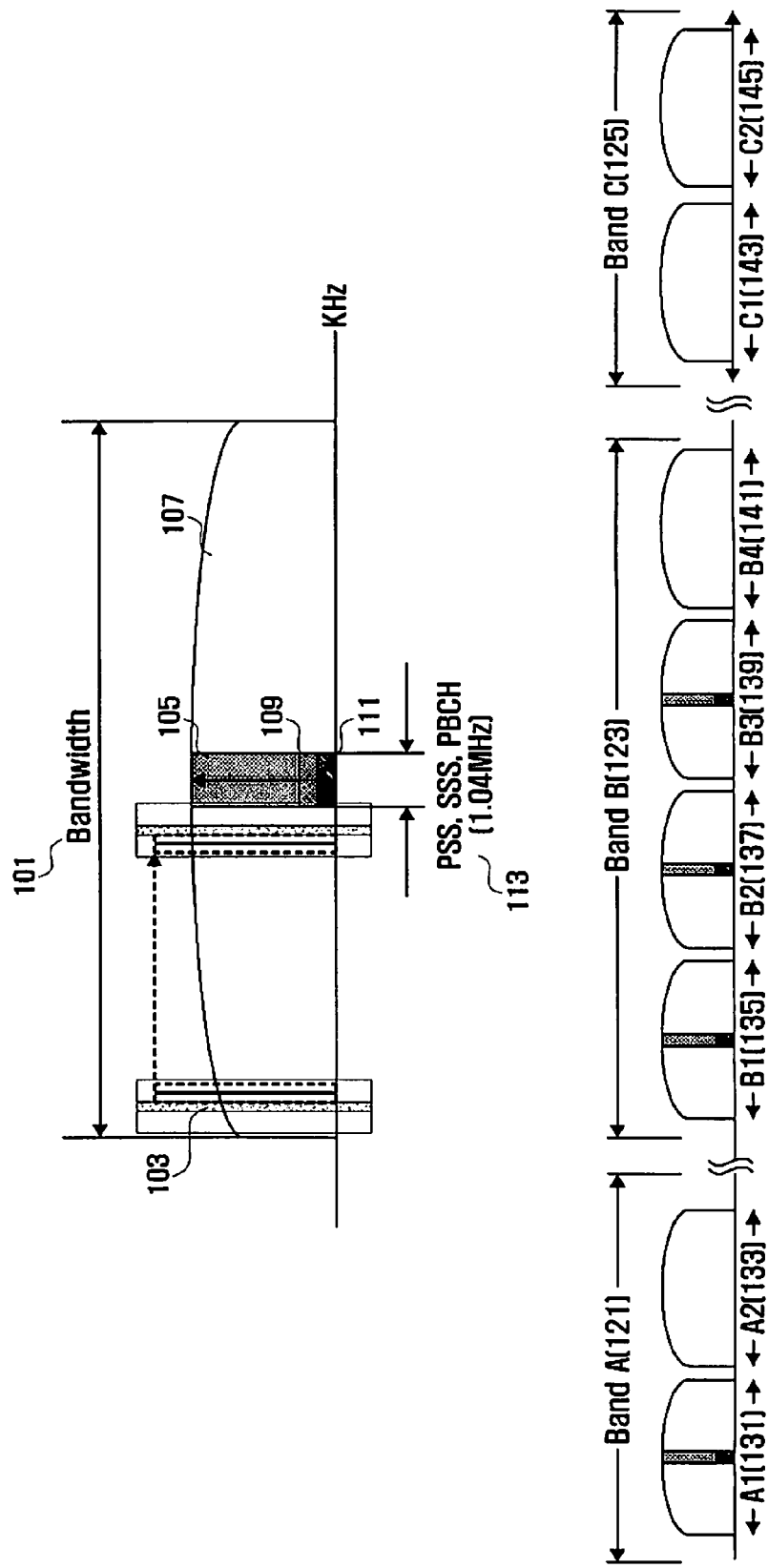
FIG. 1 illustrates a downlink band and an uplink band in a conventional LTE system.
Figure 2:
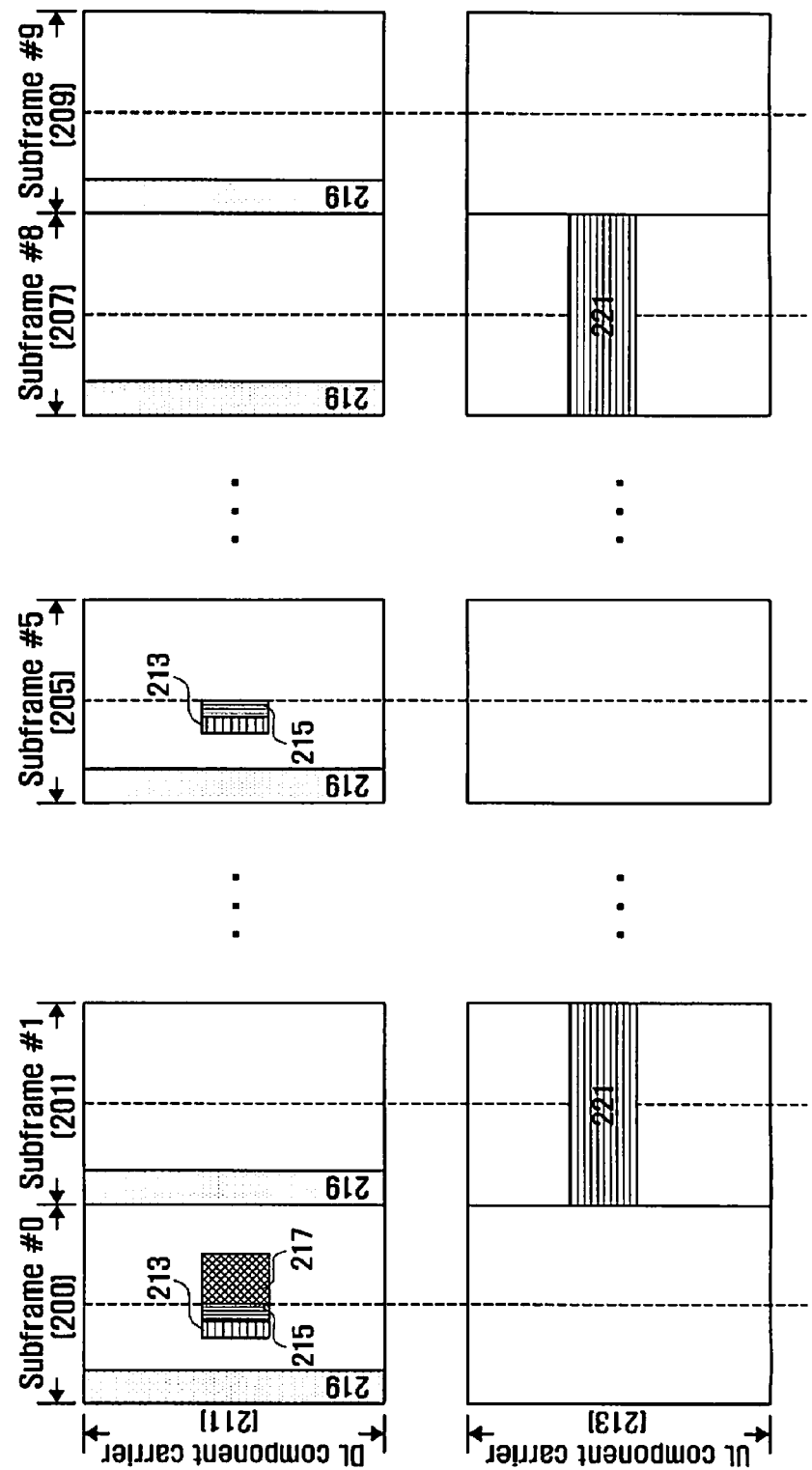
FIG. 2 illustrates a conventional structure of downlink/uplink bands in an LTE system.
Figure 3:
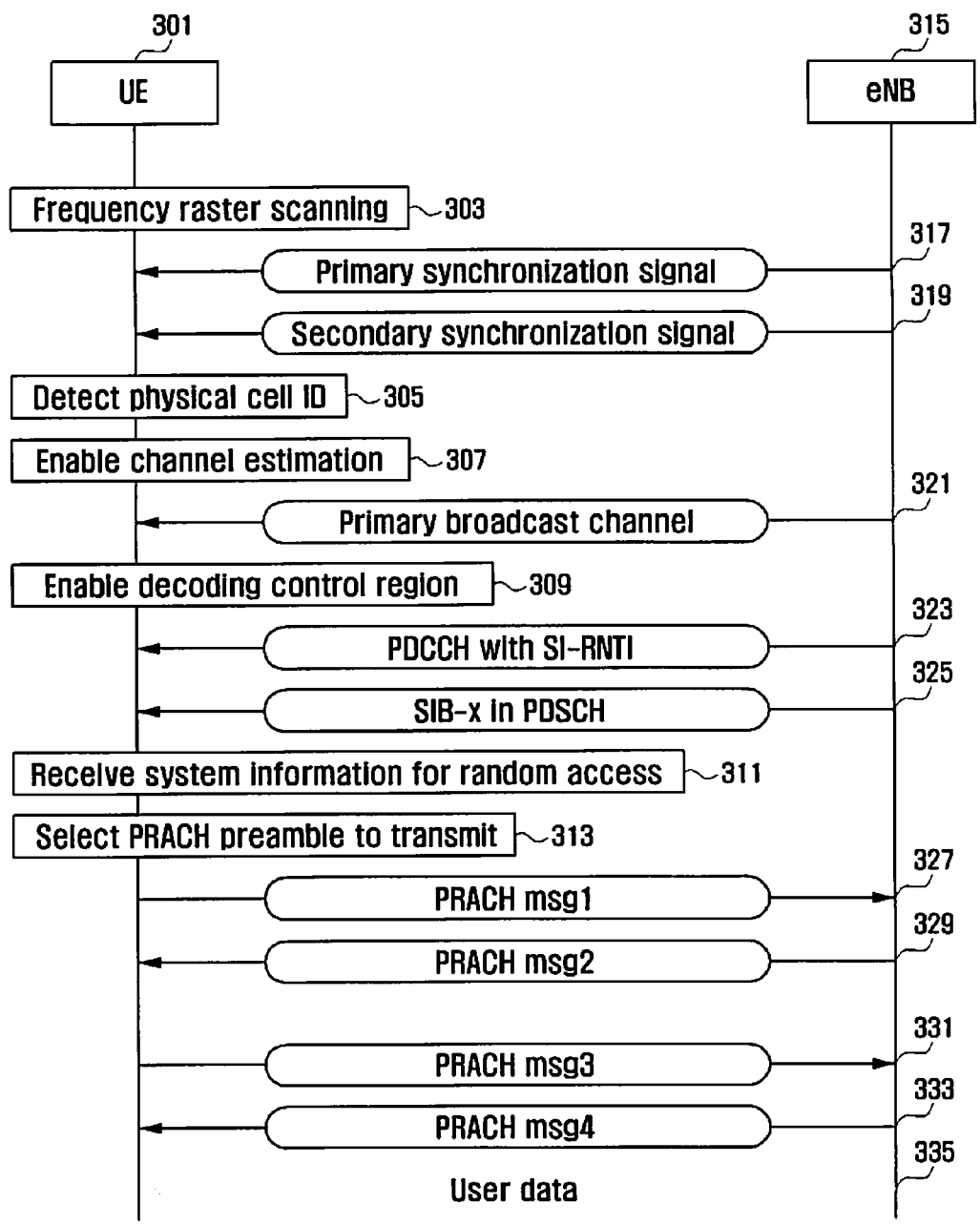
FIG. 3 illustrates a conventional process of initial access in an LTE system.

Various embodiments of the present invention will now be described more fully with reference to the accompanying drawings. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the present invention.

Furthermore, the descriptions of well known or widely used techniques, elements, structures, and processes may not be provided or illustrated in detail to avoid obscuring the essence of the present invention.

Additionally, although the drawings illustrates certain embodiments of the present invention, the drawings are not necessarily to scale and certain features may be exaggerated or omitted in order to better illustrate and explain the present invention.

Hereinafter, the phrases "different bands," "different carriers," and "different cells" may be used to have the same meaning. Also, system information set forth herein may be used together with initial access information for initial access of a mobile device.

Further, although the present invention is described using an LTE system and an LTE-advanced system herein, the present invention may be also applied to any other wireless communication systems to which a base station scheduling is applied.

FIG. 4 illustrates a configuration of system information and a structure of downlink/uplink in accordance with an embodiment of the present invention.

Referring to FIG. 4, an LTE-A system may be generally regarded as a connection of LTEs, each of which includes one downlink and one uplink. Therefore, the LTE-A system can use N downlink bands, as indicated by reference numbers 401, 403, 405, 407, and 409, and N uplink bands, as indicated by reference numbers 411, 413, 415, 417, and 419. In this case, the LTE-A system previously defines a relation between downlink bands and uplink bands, such that when data transmission is performed through a specific downlink band or uplink band, a response thereto is transmitted through a predefined uplink band or downlink band.

To enable initial access of mobile devices at all bands, the base station provides each downlink band with system information about the other bands, especially, initial access resource information. Particularly, the base station transmits initial access resource information about at least one carrier among all carriers of the entire system band through a specific carrier trying initial access.

In the embodiment illustrated in FIG. 4, the base station shares and transmits only initial access resources. In this case, the system may add multi-carrier information 445 (also referred to as "multiCellReatedInfo") to conventional SIB1 information 443 in SIB1 441. Added multi-carrier information 445 informs a mobile device that a band accessed by the mobile device is one of several bands, regardless of initial access.

Table 9 below shows information for an SIB1.

TABLE 9

Information Field in System Information Block Type 1

SystemInformationBlockType1 = SEQUENCE
{
cellAccessRelatedInfo,
cellSelectionInfo,
multiCellRelatedInfo,
freqBandIndicator,
schedulingInfoList,
{si-Periodicity, sib-MappingInfo},
si-WindowLength,
systemInfoValueTag
}

SIB2 447, which includes initial access resource information, is transmitted through system information as set forth in Table 10. Because the base station enables LTE devices to access the base station through all bands, an SIB2 has a structure involving new information, rather than modifying conventional information. Therefore, all bands transmit conventional information through SystemInformation-r8-les 449 and also send information about other bands in the system through SystemInformation-r10-les 451.

TABLE 10

Information Field in System Information

SystemInformation = CHOICE

TABLE 10-continued

Information Field in System Information

{
 SystemInformation-r8-IEs,
 SystemInformation-r10-IEs,
 criticalExtensionsFuture
}

If there is a total of N downlinks, the base station inserts N SIB2 453 into SystemInformation-r10-Ies, as is shown in Table 11 below.

TABLE 11

Information Field in System Information-r10-Ies

SystemInformation-r10-Ies = SEQUENCE
{
 SI-Info, {
 SystemInformationBlockType2_1,
 SystemInformationBlockType2_2,
 ...
 SystemInformationBlockType2_N-1
 }
}

SIB2 information about other bands of the system includes information about uplink bands corresponding to specific downlink bands. As shown in Table 12 below, such information is transmitted through DownLink UpLink (DL-UL) relation information 461. Because uplink/downlink bands may have several correspondences, such as one-to-one, one-to-many or many-to-one, DL-UL relation information 461 may be expressed as a set including at least one of: band information about downlinks; band information about uplinks; and initial access resource information, as shown in Table 13 below.

A single downlink band allows a total of Kn configurations.

Initial access resource information of other bands actually received by a mobile device is transmitted through RadioResourceConfigCommonSIB 457, as is shown in Table 14 below, which includes rach and prach configuration information 459 corresponding to Kn configuration information defined in DL-UL relation.

TABLE 12

Information Field in System Information Block Type 2

SystemInformationBlockType2 = SEQUENCE
{
 ac-BarringInfo,
 radioResourceConfigCommon,
 ue-TimersAndConstants,
 ul-CarrierFreq,
 ul-Bandwidth
 dl-ul-relation,
 mbsfn-SubframeConfigList
}

TABLE 13

Information Field in DL-UL-relation

RadioResourceConfigCommonSIB = SEQUENCE
{
 {dl_conf_1,ul_conf_1,prach_conf_1},
 {dl_conf_2,ul_conf_2,prach_conf_2}, TABLE 13-continued Information Field in DL-UL-relation ...
 {dl_conf_K-1,ul_conf_K-1,prach_conf_K-1},
}

TABLE 14

Information Field in Radio Resource Config Common SIB

RadioResourceConfigCommonSIB = SEQUENCE
{
 prach_conf_1{rach-Config,prach-Config},
 prach_conf_2{rach-Config,prach-Config},
 ...
 prach_conf_K-1{rach-Config,prach-Config},
}

The mobile device obtains initial access resource information about a synchronization receiving band and Kn pieces of initial access resource information in SIB-2 received from information about other bands included in total N systems. In order to transmit an uplink initial access signal, the mobile device randomly selects one resource from among resources of K0+SUM{Kn} as expressed in Equation (1) below.

$$\text{UE selected resource } X = \text{Rand } \% (K0 + \text{SUM}\{Kn\}),$$
$$n = 1, \ldots, N \qquad (1)$$

In Equation (1), Rand functions to generate an arbitrary number more than K0+SUM{Kn}.

In the uplink bands 411 to 419, N is 4, K0 is 1, and Kn is also 1. Therefore, a total of five resources exist.

After randomly selecting a resource, the mobile device transmits an initial access signal at one uplink band among five resources 431, 433, 435, 437, and 439.

FIG. 5 is a flow diagram illustrating a process of initial access in a multi-carrier configuration of an LTE-A device in accordance with an embodiment of the present invention.

Referring to FIG. 5, in step 503, a mobile device 501 performs a frequency raster scanning for a search of a synchronization signal transmitted from a base station 519, after being powered on. The LTE-A mobile device 501 (also referred to as a UE) receives, through a carrier trying initial access, initial access resource information about at least one carrier among carriers of the entire system band from a base station (or eNB) 519. Specifically, in step 505, the LTE-A mobile device 501 receives a physical cell ID from the base station 519. A physical cell ID is a part of the entire band. If a received band is A, for example, the mobile device 501 receives MIB from A band or cell in step 525. When obtaining system information SIB-1 from band A through a PDCCH and a PDSCH on the basis of an MIB, in step 511, the mobile device 501 recognizes that band A is a part of multi-carrier or cell, and also that the system information to be received includes control information about multi-carrier or cell.

Thereafter, if the mobile device 501 receives SIB-2 from band or cell A, SIB-2 includes initial access resource information about other band or cell in the system.

In step 513, the mobile device 501 selects a resource by generating an arbitrary number. In step 515, the mobile device 501 determines an uplink band or cell for initial access signal transmission by using relation information between resources and bands included in the SIB-2. In step 530, the mobile device 501 receives a PBCH signal of a determined band or cell before sending an initial access signal. The mobile device 501 should know MIB information about a multi-band or cell in order to receive a PDCCH, when an initial access response signal (msg2) is offered through a PDCCH in response to an initial access signal (msg1).

After receiving MIB, the mobile device 501 transmits an initial access signal (msg1) through a selected band in step 531, and then waits for an initial access response signal (msg2) at a receiving band in step 533. If there is an uplink band or cell through which an initial access signal (msg1) is received, the base station 519 transmits an initial access response signal (msg2) through a predefined downlink band in step 535. In step 537, the mobile device 501 transmits a system access signal (msg3). When system access is completed, the base station 519 transmits a related signal (msg4) in step 539, which enables data transmission in step 541.

Figure 6A:
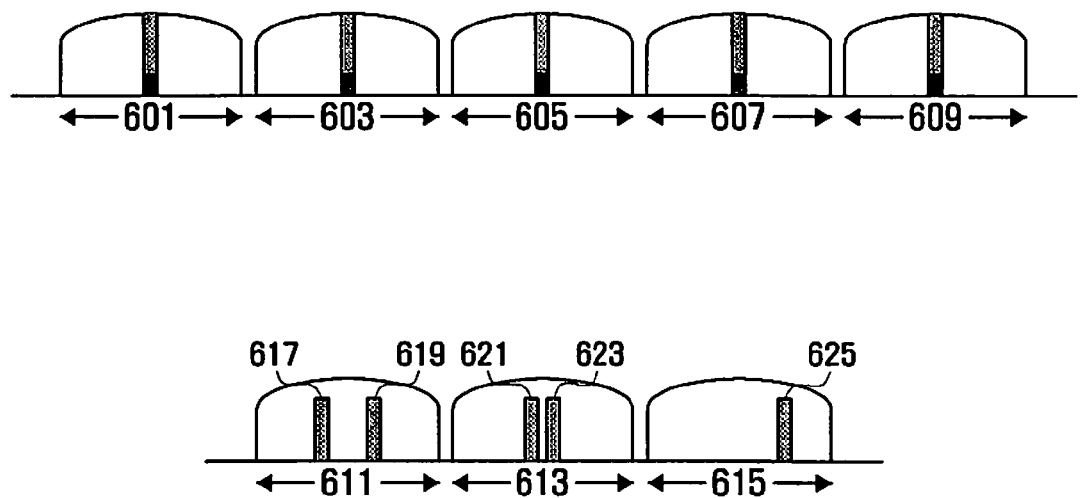

FIGS. 6A and 6B illustrate imbalanced downlink/uplink bands in accordance with an embodiment of the present invention.

Referring to FIG. 6A, which illustrates many downlink bands and relatively fewer uplink bands, because a downlink band only has a physical cell ID, the system predefines a relation between a downlink band and an uplink band. In this case, two downlink bands 601 and 603 are connected with a single uplink band 611, two downlink bands 605 and 607 are connected with a single uplink band 613, and a single downlink band 609 is connected with an uplink band 615. Additionally, system information N is 2, K0 is 2, and a resource combination Kn corresponding to each of N is 2 and 1. Therefore, resources selected by the mobile device are five (2+2+1), as indicated by reference numbers 617, 619, 621, 623, and 625.

Referring to FIG. 6B, which illustrates a few downlink bands and relatively more uplink bands, a downlink band 627 is connected with two uplink bands 631 and 633, and a downlink band 629 is connected with an uplink band 635. Additionally, N is 1, K0 is 2, and Kn is 1. Therefore, selected resources are three (1+1+1), as indicated by reference numbers 637, 639, and 641. If a resource 637 or 639 is selected, the same downlink 627 is used.

Figure 7:
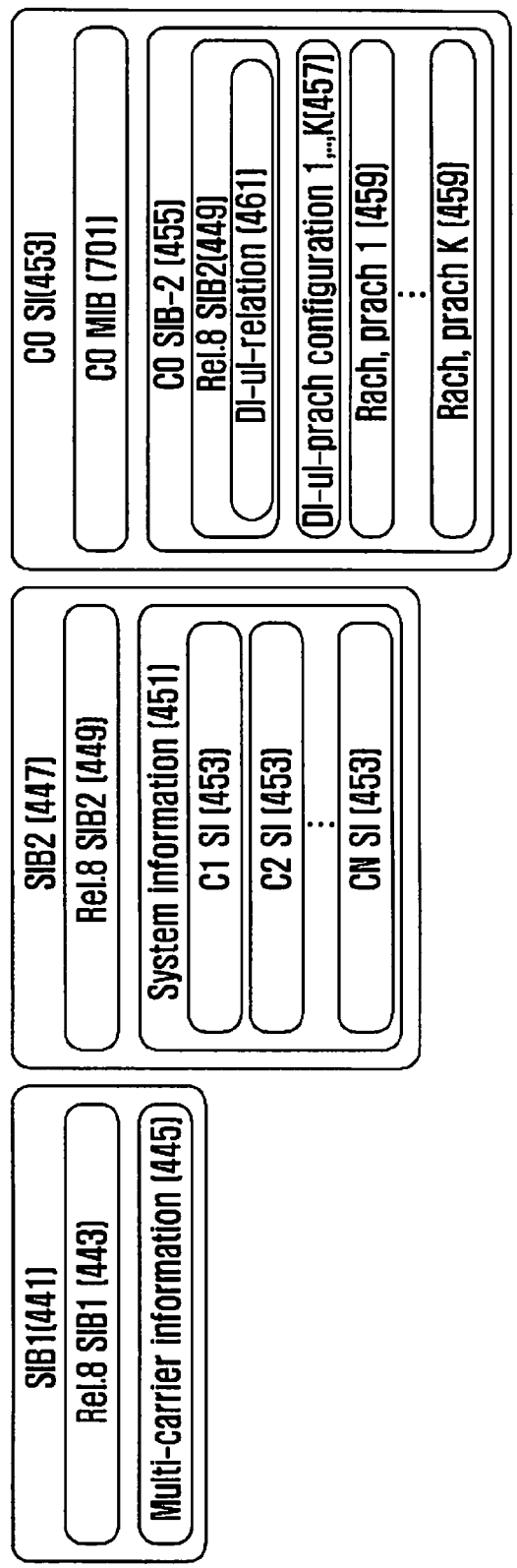
FIG. 7 illustrates a configuration of system information in accordance with an embodiment of the present invention.

FIG. 7 illustrates system information for initial access at multi-band or cell in accordance with an embodiment of the present invention.

In this embodiment, an MIB of a multi-band or cell is also transmitted in the system information. In this case, the mobile device does not require a PBCH receiving step, and transmits an initial access signal (msg1) immediately. It is therefore possible to reduce initial access time of the mobile device. However, this embodiment may unfavorably increase an amount of data a multi-band or cell should transmit.

Referring to FIG. 7, most information about every multi-band or cell is similar to that described in FIG. 4, except for MIB 701 of each band, which is included with SIB2 455 in system information 453.

Table 15 below shows system information for initial access in accordance with an embodiment of the present invention.

TABLE 15

| Information Field in System Information-r10-Ies |
| --- |
| SystemInformation-r10-Ies = SEQUENCE<br>{<br>SI-TypeAndInfo, { |

TABLE 15-continued

| Information Field in System Information-r10-Ies |
| --- |
| MasterInformationBlock__1,SystemInformationBlockType2__1<br>MasterInformationBlock__2,SystemInformationBlockType2__2<br>...<br>MasterInformationBlock__N,SystemInformationBlockType2__N,<br>}<br>} |

Table 16 below shows MIB information of system information required for initial access. This is the same as MIB received through PBCH.

TABLE 16

| Information Field in Master Information Block |
| --- |
| MasterInformationBlock__n = SEQUENCE<br>{<br>dl-Bandwidth,<br>phich-Cong,<br>systemFrameNumber,<br>spare<br>} |

Figure 8:
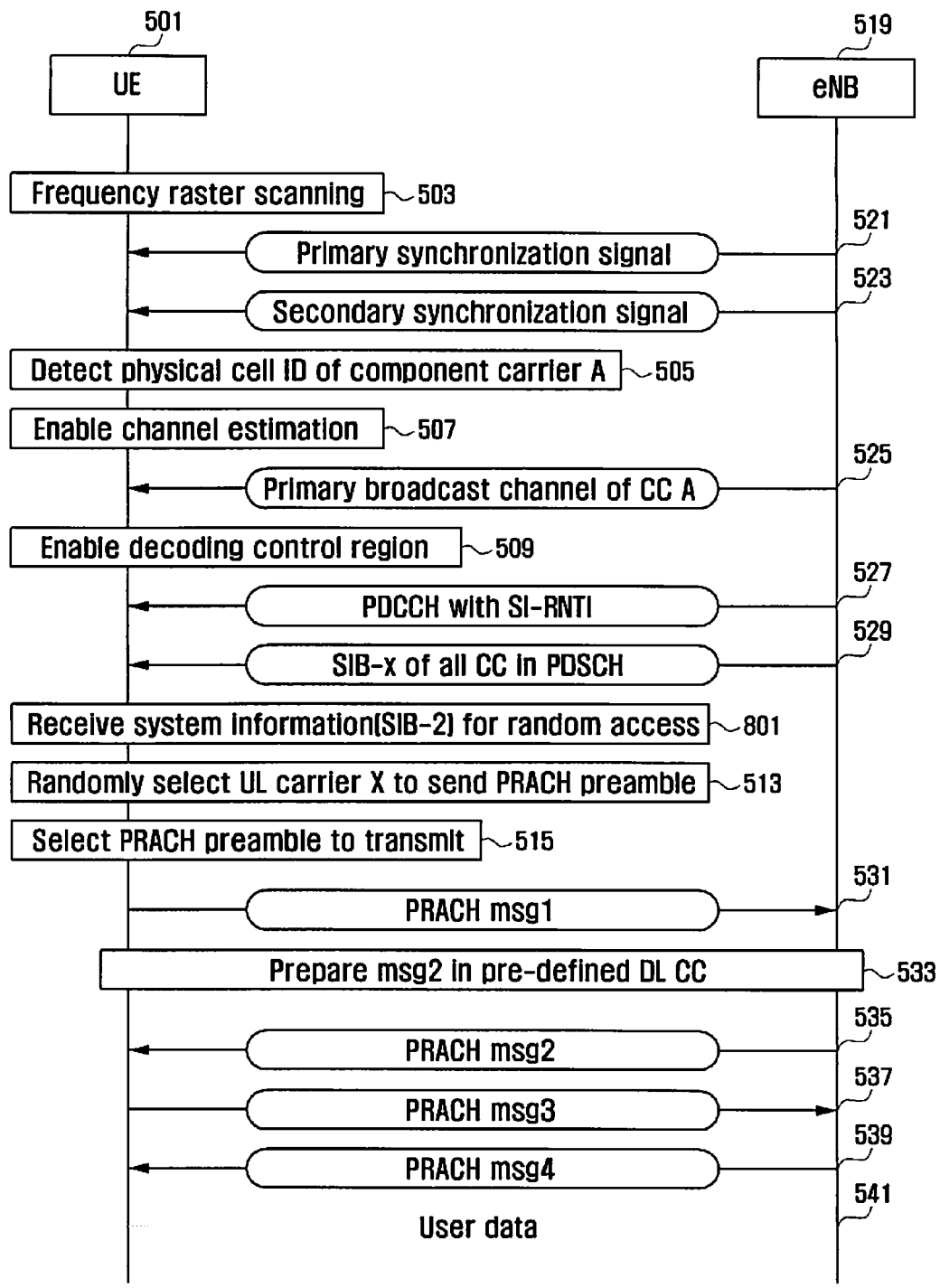
FIG. 8 is a flow diagram illustrating a process of initial access in a multi-carrier configuration in accordance with an embodiment of the present invention.

FIG. 8 is a flow diagram illustrating a process of initial access in a multi-band or cell in accordance with an embodiment of the present invention.

Referring to FIG. 8, in step 503, a mobile device 501 performs a frequency raster scanning for a search of a synchronization signal transmitted from a base station 519, after being powered on. The LTE-A mobile device (or UE) 501 receives a physical cell ID from the base station (or eNB) 519 in step 505. A physical cell ID is a part of the entire band. If a received band is A, for example, the mobile device 501 receives an MIB from A band or cell in step 525. When obtaining a system information MIB and SIB-1 from band A through PDCCH and PDSCH on the basis of the MIB, in step 801, the mobile device 501 recognizes that band A is a part of multi-carrier or cell, and also that the system information to be received includes control information about multi-carrier or cell.

Thereafter, if the mobile device receives SIB-2 from band or cell A, SIB-2 includes initial access information about other band or cell in the system. In step 513, the mobile device 501 selects a resource by generating an arbitrary number. In step 515, the mobile device 501 determines an uplink band or cell for initial access signal transmission by using relation information between resources and bands included in SIB-2. In step 531, the mobile device 501 transmits an initial access signal (msg1) through a selected band, and then waits for an initial access response signal (msg2) at a receiving band in step 533. If there is an uplink band or cell through which an initial access signal (msg1) is received, the base station 519 transmits an initial access response signal (msg2) through a predefined downlink band in step 535. In step 537, the mobile device 501 transmits a system access signal (msg3). When system access is completed, in step 539, the base station 519 transmits a related signal (msg4), which enables data transmission in step 541.

FIG. 9 illustrates a configuration of system information in accordance with an embodiment of the present invention.

Referring to FIG. 9, downlink bands or cells 901 and 903 are defined, and uplink bands 905, 907 and 909 are also defined. Also, in a relation between a downlink band or cell and an uplink band, a downlink band or cell 901 is connected with uplink bands 905 and 907, and a downlink band or cell 903 is connected with an uplink bands 909. If an LTE device sends an initial access signal only through the uplink band 905 and the LTE-A device uses a structure only enabling initial access signal transmission through an uplink band 907, if an uplink band 905 is connected with too many devices and does not allow further connections, or if the initial access rate is higher at a specific band, the base station may transmit information about restriction or permission of a specific initial access resource through SIB-2 information about a multi-band, as indicated by a reference number 921.

Related information in DL-UL-relation is shown in Table 17 below.

A mobile device randomly selects an initial access resource among permissible resources as expressed in Equation (2) below.

$$\text{UE selected resource } X=\text{Rand } \% \ (K0+\text{SUM}\{Kn\}), \\ n=\{\text{permission set}\} \qquad (2)$$

TABLE 17

Information Field in DL-UL-relation

RadioResourceConfigCommonSIB = SEQUENCE
{
{dl_conf_1,ul_conf_1,prach_conf_1},
{dl_conf_2,ul_conf_2,prach_conf_2},
...
{dl_conf_K−1,ul_conf_K−1,prach_conf_K−1},
restriction BITS{1..K−1}
}
or
RadioResourceConfigCommonSIB = SEQUENCE
{
{dl_conf_1,ul_conf_1,prach_conf_1},
{dl_conf_2,ul_conf_2,prach_conf_2},
...
{dl_conf_K−1,ul_conf_K−1,prach_conf_K−1},
Permision BITS{1..K−1}
}

Figure 10:
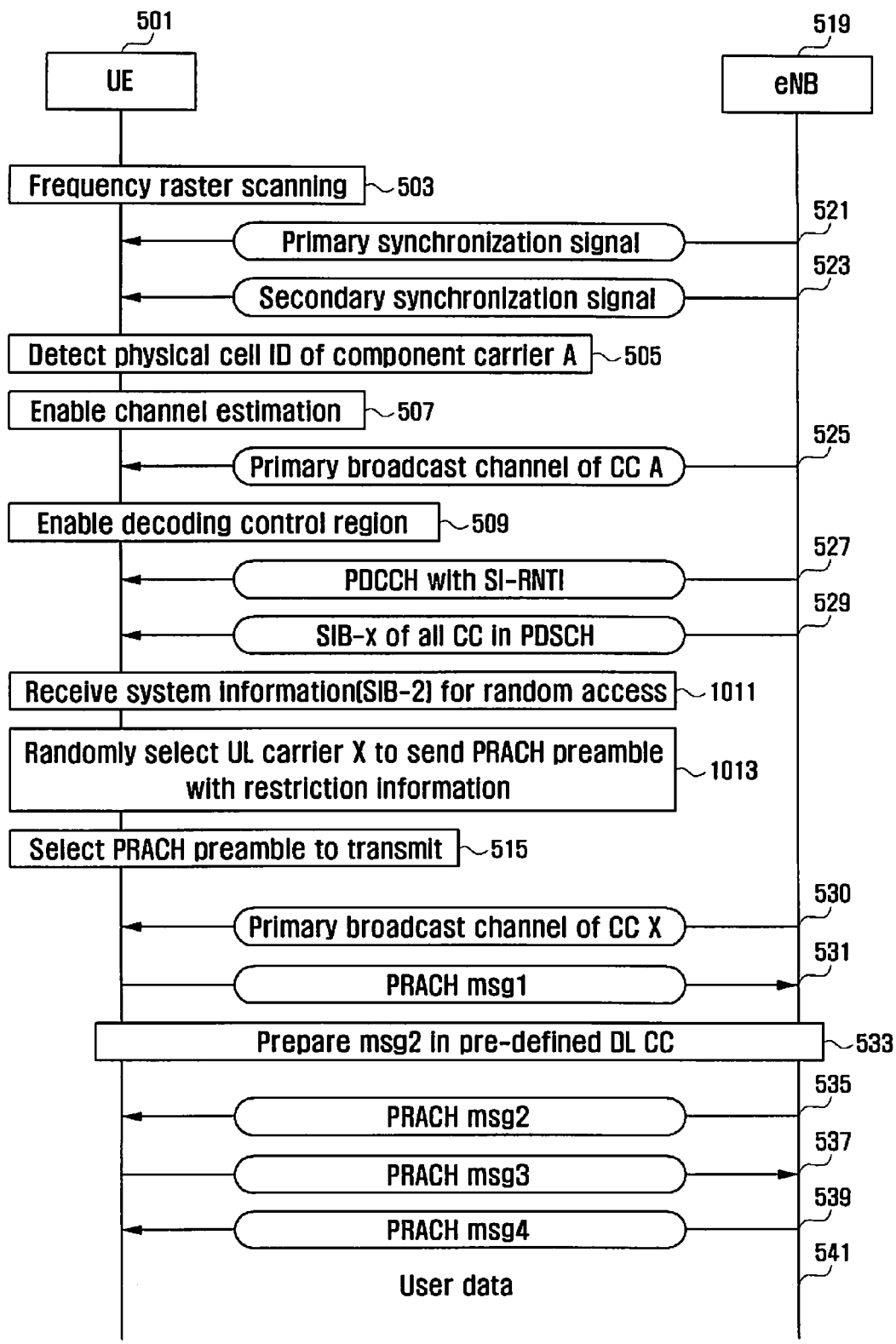
FIG. 10 is a flow diagram illustrating a process of initial access in a multi-carrier configuration in accordance with an embodiment of the present invention.

FIG. 10 is a flow diagram illustrating a process of initial access in a multi-band or cell in accordance with an embodiment of the present invention.

Referring to FIG. 10, the LTE-A mobile device (or UE) 501 receives a physical cell ID from the base station (or eNB) 519 in step 505. A physical cell ID is a part of the entire band. If a received band is A, for example, the mobile device 501 receives an MIB from A band or cell in step 525. When obtaining system information SIB-1 from band A through a PDCCH and a PDCCH on the basis of the MIB, in step 511, the mobile device 501 recognizes that band A is a part of multi-carrier or cell and also that the system information to be received includes control information about multi-carrier or cell.

In step 1011, if the mobile device 501 receives SIB-2 from a band or cell A, SIB-2 includes initial access resource information about other band or cell in the system and further includes access restriction or permission information. In step 1013, the mobile device 501 selects a resource by generating an arbitrary number. In step 515, the mobile device 501 determines an uplink band or cell for initial access signal transmission by using relation information between resources and bands included in SIB-2. In step 530, the mobile device 501 receives a PBCH signal of a determined band or cell before sending an initial access signal. The mobile device 501 should know MIB information about a multi-band or cell in order to receive a PDCCH when an initial access response signal (msg2) is offered through the PDCCH in response to an initial access signal (msg1).

After receiving MIB, the mobile device 501 transmits an initial access signal (msg1) through a selected band in step 531, and then waits for an initial access response signal (msg2) at a receiving band in step 533. If there is an uplink band or cell through which an initial access signal (msg1) is received, the base station 519 transmits an initial access response signal (msg2) through a predefined downlink band in step 535. In step 537, the mobile device 501 transmits a system access signal (msg3). When system access is completed, the base station 519 transmits a related signal (msg4) in step 539, which enables data transmission in step 541.

Figure 11:
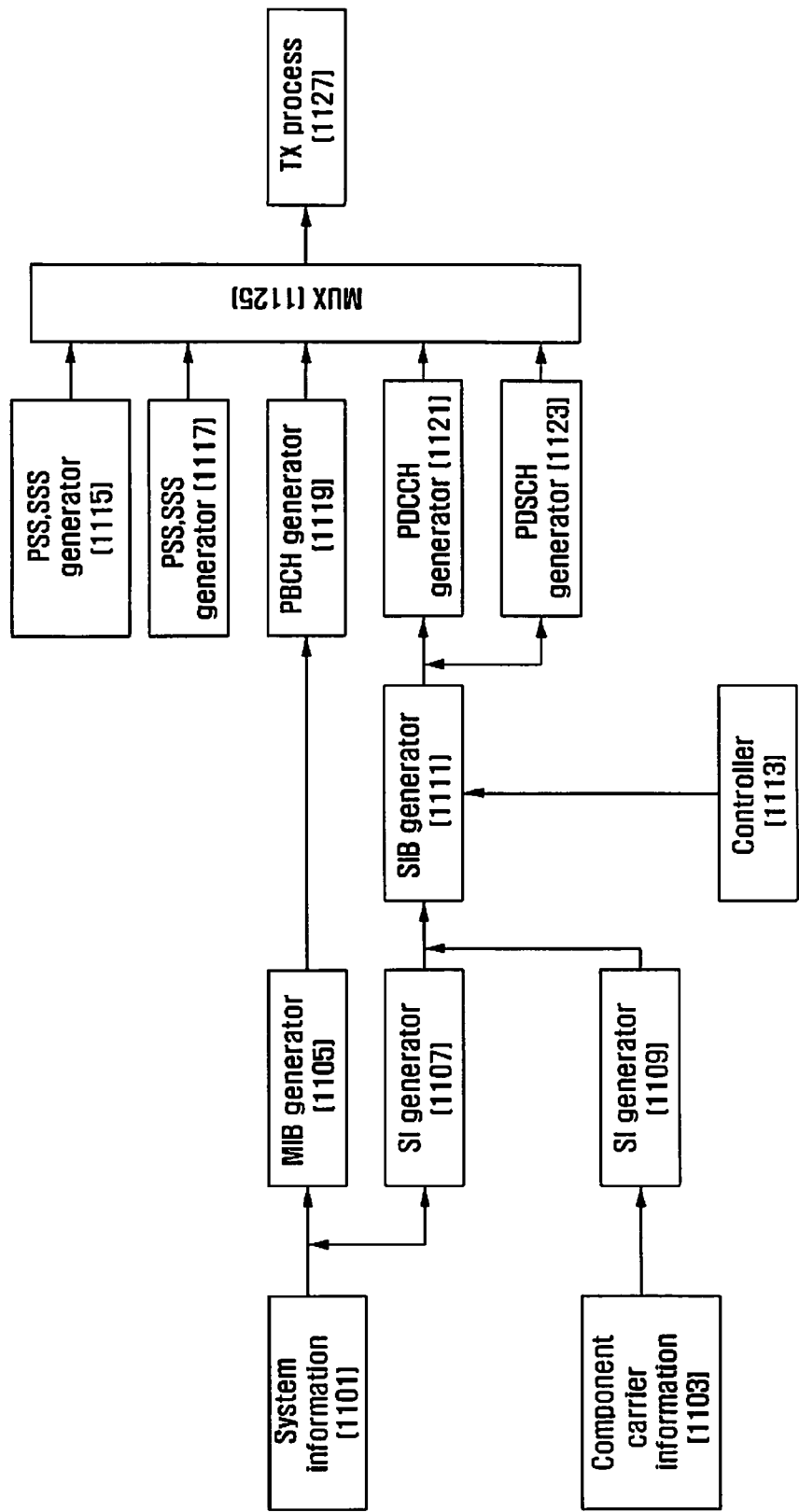
FIG. 11 illustrates a base station in accordance with an embodiment of the present invention.

FIG. 11 illustrates a base station in accordance with an embodiment of the present invention.

Referring to FIG. 11, the base station configures system information 1101 and component carrier information 1103 about a multi-band or cell by using resource information about a multi-band or cell. The base station configures basic system information (or initial access resource information) through an MIB generator 1105 by using system information at every band, and also configures SIB information through a synchronized band SI generator 1107 by using the remaining system information.

Additionally, the base station configures information about multi-band or cell other than a synchronized band through a multi-band SI generator 1109. A base station controller 1113 enables an SIB generator 1111 to merge system information about a current band, which is output from the synchronized band SI generator 1107, and system information about the other bands, which is output from the multi-band SI generator 1109, and then to configure a single SIB.

Particularly, when generating SIB-1, the base station controller 1113 may insert multi-carrier information indicating that an accessible band is a multi-band. Also, when generating SIB-2, the base station controller 1113 may insert initial access resource information about an accessible multi-band.

Additionally, the base station controller 1113 may also insert an MIB about a multi-band into SIB-2.

Also, the base station controller 1113 may also insert a restriction or permission information about an arbitrary initial access resource into the SIB-2.

An MIB configured by the MIB generator 1105 is allocated to a PBCH generator 1119, and SIB configured by the SIB generator 1111 is allocated to both a PDCCH generator 1121 and a PDSCH generator 1123. Also, a physical cell ID is configured through PSS and SSS generators 1115 and 1117. Each channel is multiplexed through a multiplexer 1125 and then transmitted through a transmitter 1127.

Figure 12:
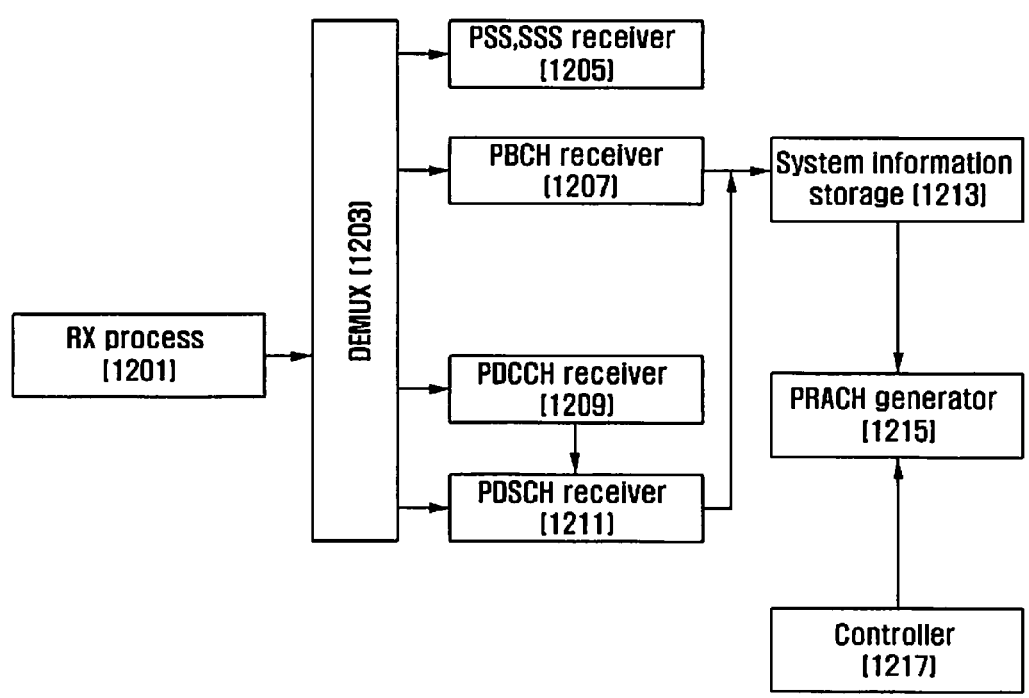
FIG. 12 illustrates a mobile device in accordance with an embodiment of the present invention.

FIG. 12 illustrates a mobile device in accordance with an embodiment of the present invention.

Referring to FIG. 12, a transmitter and a receiver (or a transceiver) transmits and receives a signal for initial access of the mobile device.

A signal received at a receiver 1201 is separated through a demultiplexer 1203. Additionally, a physical cell ID is received through a PSS, SSS receiver 1205, an MIB is received through a PBCH receiver 1207 and then stored in a system information storage 1213. An SIB is received through a PDCCH receiver 1209 and a PDSCH receiver 1211 and also stored in the system information storage 1213.

The SIB stored in the system information storage 1213 includes SIB-1 and SIB-2. According to an embodiment of the present invention, SIB-1 may have multi-carrier information indicating that an accessible band is a multi-band. Also, SIB-2 may include initial access resource information about an accessible multi-band.

According to another embodiment, SIB-2 may include an MIB about a multi-band.

According to another embodiment, SIB-2 may also include a restriction or permission information about an arbitrary initial access resource.

A mobile device controller 1217 controls receiving initial access resource information, through a specific carrier trying initial access, about at least one carrier from among carriers in all of the system bands from the base station. Additionally, the controller 1217 selects an arbitrary initial access resource by using received initial access resource information, and also controls transmitting an initial access signal by using a selected initial access resource.

While the present invention has been illustrated and described with reference to certain embodiments thereof, it will be understood by those skilled in the art that various changes in form and details may be made therein without departing from the spirit and scope of the present invention as defined by the appended claims.

What is claimed is:

1. A method for performing initial access by a mobile device in a multi-carrier system, the method comprising:
   receiving, from a base station on a first carrier trying initial access, first system information including a multi-carrier indication information and second system information including initial access resource information including first initial access resource information on the first carrier and second initial access resource information on a second carrier;
   selecting an initial access resource by using the multi-carrier indication information and the received initial access resource information; and
   transmitting, to the base station, an initial access signal by using the selected initial access resource,
   wherein the multi-carrier indication information indicates that the first carrier is a part of the multi-carrier,
   wherein the initial access resource information includes permission information indicating whether the mobile device is allowed to access to the first carrier and the second carrier, and
   wherein the permission information is generated based on initial access rate for each of the first carrier and the second carrier by the base station.

2. The method of claim 1, wherein the initial access resource information includes information about an uplink band corresponding to a downlink band, and
   wherein transmitting the initial access signal comprises transmitting the initial access signal through a band that is predetermined using the information about the uplink band.

3. The method of claim 1, wherein the initial access resource information includes a master information block about an entire system band, and
   wherein transmitting the initial access signal comprises transmitting the initial access signal to the base station, without receiving a broadcast channel, after selecting the initial access resource.

4. A method for performing initial access by a base station in a multi-carrier system, the method comprising:
   transmitting, to a mobile device through a first carrier to which the mobile device tries the initial access, first system information including multi-carrier indication information and second system information including initial access resource information including first initial access resource information on the first carrier and second initial access resource information on a second carrier;
   receiving an initial access signal through an initial access resource selected by the mobile device by using the multi-carrier indication information and the received initial access resource information; and
   transmitting, to the mobile device, an initial access response signal in response to the received initial access signal,
   wherein the multi-carrier indication information indicates that the first carrier is a part of the multi-carrier,
   wherein the initial access resource information includes permission information indicating whether the mobile device is allowed to access to the first carrier and the second carrier, and
   wherein the permission information is generated based on initial access rate for each of the first carrier and the second carrier by the base station.

5. The method of claim 4, wherein the initial access resource information includes information about an uplink band corresponding to a downlink band, and
   wherein receiving the initial access signal comprises receiving the initial access signal through a band that is predetermined using the information about the uplink band.

6. The method of claim 4, wherein the initial access resource information includes a master information block about an entire system band, and
   wherein receiving the initial access signal comprises receiving the initial access signal, without receiving a broadcast channel, after the mobile device selects the initial access resource.

7. A mobile device for performing initial access to a base station in a multi-carrier system, the mobile device comprising:
   a transceiver that transmits and receives a signal for the initial access; and
   a controller that controls receiving, from the base station through a first carrier trying the initial access, first system information including multi-carrier indication information and second system information including initial access resource information including first initial access resource information on the first carrier and second initial access resource information on a second carrier selects an initial access resource by using the multi-carrier indication information and the received initial access resource information, and controls transmitting an initial access signal to the base station by using the selected initial access resource,
   wherein the multi-carrier indication information indicates that the first carrier is a part of the multi-carrier,
   wherein the initial access resource information includes permission information indicating whether the mobile device is allowed to access to the first carrier and the second carrier, and
   wherein the permission information is generated based on initial access rate for each of the first carrier and the second carrier by the base station.

8. The mobile device of claim 7, wherein the initial access resource information includes information about an uplink band corresponding to a downlink band, and
   wherein the controller controls transmitting the initial access signal through a band predetermined using the information about the uplink band.

9. The mobile device of claim 7, wherein the initial access resource information includes a master information block about an entire system band, and wherein the controller controls transmitting the initial access signal to the base station, without receiving a broadcast channel, after selecting the initial access resource.

10. A base station for performing initial access with a mobile device in a multi-carrier system, the base station comprising:
a transceiver for transmitting and receiving a signal; and
a controller for transmitting first system information including a multi-carrier indication information and second system information including initial access resource information including first initial access resource information on a first carrier to which the mobile device tries initial access and second initial access resource information on a second carrier and receiving an initial access signal through an initial access resource selected by the mobile device by using the multi-carrier indication information and the initial access resource information,
wherein the multi-carrier indication information indicates that the first carrier is a part of the multi-carrier,
wherein the initial access resource information includes permission information indicating whether the mobile device is allowed to access to the first carrier and the second carrier, and
wherein the permission information is generated based on initial access rate for each of the first carrier and the second carrier by the base station.

11. The base station of claim 10, wherein the initial access resource information includes information about an uplink band corresponding to a downlink band, and
wherein the transceiver receives the initial access signal through a band that is predetermined using the information about the uplink band.

12. The base station of claim 10, wherein the initial access resource information includes a master information block about an entire system band, and
wherein the transceiver receives the initial access signal, without receiving a broadcast channel, after the mobile device selects the initial access resource.

* * * * *